Patented Oct. 12, 1943

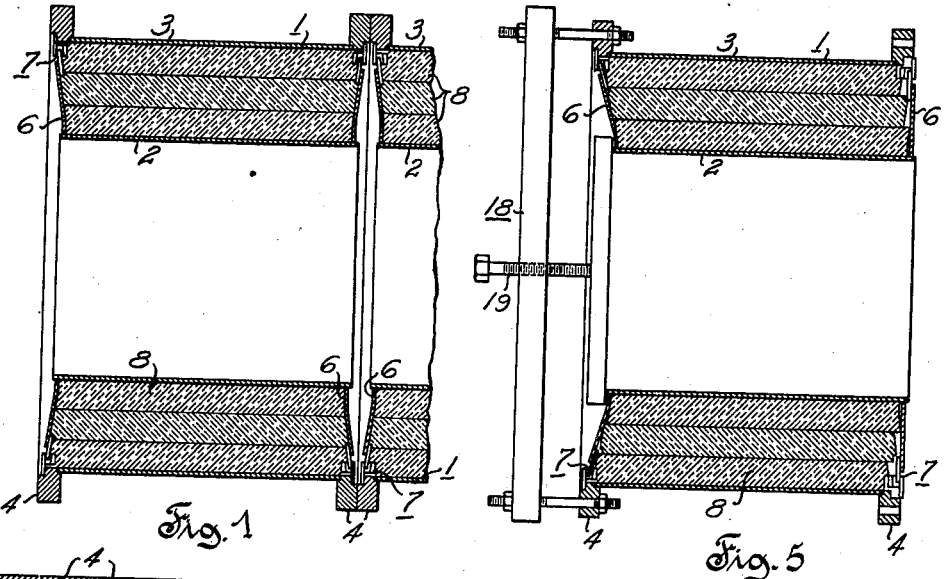
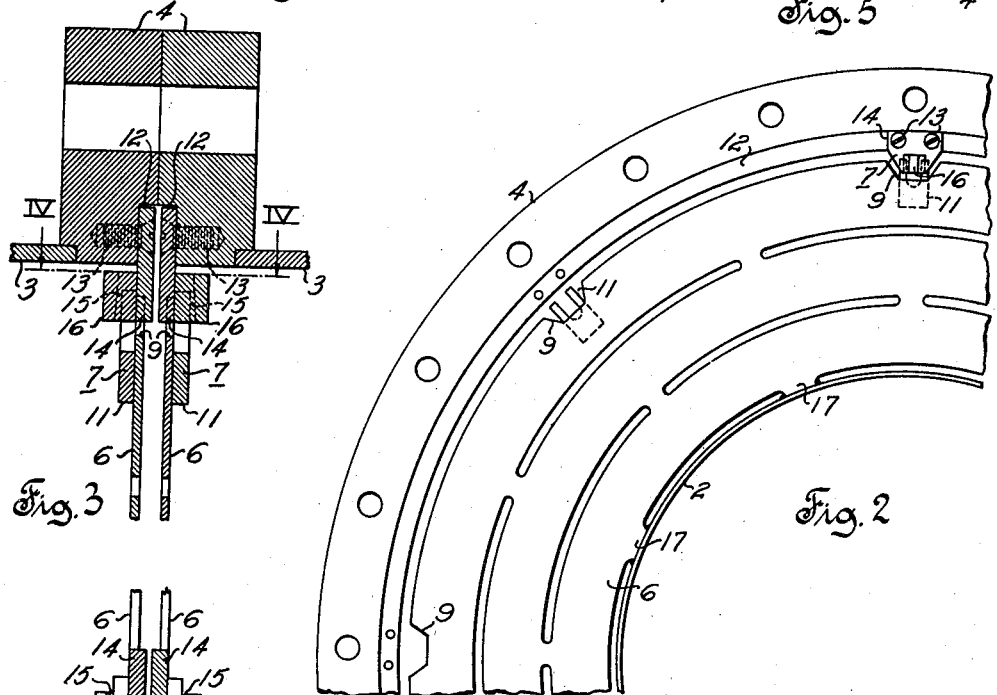

2,331,645

UNITED STATES PATENT OFFICE 2,331,645

TURBINE INLET PIPING

Hans A. Altorfer, Milwaukee, Wis., assignor to Allis-Chalmers Manufacturing Company, Milwaukee, Wis., a corporation of Delaware Application September 14, 1942, Serial No. 458,211

11 Claims. (Cl. 138—64)

This invention relates generally to elastic fluid turbine apparatus and more particularly to high temperature gaseous motive fluid confining and conducting structures capable of safely withstanding large variations in the temperature and pressure of the confined fluid.

The invention is particularly applicable, although in no manner limited, to the jacketed combustion chambers and/or motive fluid conductors employed in combustion turbine systems in which the inner motive fluid confining wall becomes extremely hot and incapable of safely withstanding the stresses set up therein (a) by appreciable differences in the pressures of the fluids acting upon opposite sides of said wall and (b) by its expansion and contraction, both longitudinally and radially, relative to the outer surrounding wall. In recently proposed constructions, said stresses are entirely eliminated and/or materially reduced by providing breathing openings in the inner wall and filling the space between the inner and outer walls with permeable insulation and by supporting the inner wall in a manner permitting movements of same both longitudinally and radially with respect to the outer wall. In one such construction, the inner wall is made in longitudinally spaced sections which have their ends coaxially interconnected with longitudinally spaced opposed portions of the inner surface of the outer wall by means of interposed, imperforate annular disks and radially alined bifurcated connections permitting radial movement of the disk relative to the outer wall and permitting independent radial movement of the disk and of the inner wall section relative to each other.

The aforementioned disk construction, although an improvement over the structures heretofore employed, is not entirely satisfactory in that if the disks and the connections are made sufficiently strong to withstand the stresses set up therein under conditions of high temperature, too much heat will be transmitted to the outer wall.

It is therefore an object of this invention to provide an improved lining section suspension which minimizes heat conduction to the outer surrounding wall and which effects a reduction in the forces resisting both longitudinal and radial expansion of the lining as its temperature increases. In accordance with this invention, one or more of the aforementioned improved results may be obtained by employing lining sections each of which is connected to circumferentially spaced portions of the surrounding outer wall by a pair of readily flexible perforated disks or an equivalent connecting structure, and each of which is shorter in length than the longitudinal spacing of said pair of disks, thereby initially flexing the disks of said pair toward each other which initially stresses said disks and lining section and results in said stresses decreasing substantially to zero values as the lining and disks become heated to the temperature attained during normal operation of the system embodying same.

The invention accordingly consists of the various features of construction, combinations of elements and arrangements of parts as is more fully set forth in the appended claims and in the detailed description, reference being had to the accompanying drawing, in which:

Fig. 1 is a longitudinal section illustrating a portion of a horizontal run of turbine inlet piping embodying the invention;

Fig. 2 is a partial end view of a section of the piping shown in Fig. 1;

Fig. 3 is an enlarged detail of the connections between the inner lining and outer wall sections shown in Fig. 1;

Fig. 4 is a partial section taken on line IV—IV of Fig. 3; and

Fig. 5 is a longitudinal section illustrating one of the steps employed in assembling a section of the piping shown in Fig. 1.

Referring to Fig. 1 of the drawing, it is seen that piping embodying the invention may comprise coaxial sections 1, each being formed by an annular inner wall or lining section 2, an outer annular wall section 3 having flanged ends 4 adapted to be bolted or otherwise coaxially connected with a similar section, an annular, axially flexible perforated disk 6 united in radially extending relation to each end of said inner section 2, connections 7 between the outer periphery of the disks 6 and the opposed end portions of the surrounding outer section 3 rendering said inner section 2 and the disks 6 secured thereto radially movable as a unit relative to the surrounding outer section 3, and permeable insulation 8 substantially filling the space formed by said inner and outer sections and the disks 6.

Referring to Figs. 2, 3 and 4, it is seen that the connections 7 may be formed by providing the outer edge of each disk 6 with a series of circumferentially spaced outwardly diverging notches 9, by securing to the outer portion of each disk 6 a series of circumferentially spaced bifurcated tabs 11 having their bifurcated ends extending radially outward in overlying relation with respect to the notches 9 as best shown in Fig. 2, by providing a circumferential recess 12 in the inner surface portion of the flanged ends 4 of each outer section 3, and by removably securing in said recess as by means of screw 13 a series of circumferentially spaced tabs 14 which extend radially inward and terminate in a T-shaped head 16 having its stem portion disposed between the bifurcations of the opposed tabs 11 on the disks 6 as shown. The depth of the recesses 12 is preferably made somewhat greater than the thickness of the tabs 14 to facilitate assembly of the connections 7.

Referring again to Fig. 1, which represents the relative positions of the various parts when cool, it is seen that the inner section 2 is of less length than the outer section 3, the difference in length being approximately equal to the maximum distance the inner section expands longitudinally when heated to its normal operating temperature, and that therefore the disks 6 on each section 2 are flexed longitudinally or axially of the pipe section and toward each other as shown. The perforations in the disks 6 render them more flexible and also function to place the space between adjacent inner sections 2 and the disks 6 secured thereon in communication with the space containing the insulation 8, thereby affording the breathing action necessary to equalize at all times the pressures acting upon opposite sides of the sections 2. When the piping attains its normal operating temperature, the relative longitudinal expansion of the adjacent inner sections 2 nearly closes the gap therebetween, just sufficient space being left to provide the aforementioned breathing action and to provide for a slight degree of overexpansion in the event the structure should become overheated.

The inner periphery of the disks 6 (see Fig. 2) is preferably provided with a series of circumferentially spaced, inwardly extending projections 17 which abut and are welded or otherwise secured to the outer surface of the inner sections 2 as shown, thereby reducing the contact area between said sections and disks and the heat transfer therethrough. In a like manner, the coacting tabs 11 and 14 reduce the transfer of heat from the disk 6 to the surrounding outer wall section 3; the perforations in the disks 6 also functioning to materially reduce their heat transmitting or conducting effectiveness. The tabs 11 and 14 also render each inner section 2 and the disks 6 secured thereto substantially free to expand and contract radially relative to the surrounding outer wall section 3. In this connection, it should be noted that the underside of the T-shaped heads 16 on the tabs 14 are beveled to provide an inwardly diverging bifurcation receiving space 15 to facilitate radial movement of the tabs 11 relative to the tabs 14. The piping shown in Fig. 1 can be readily assembled, assuming that the disks 6 to which are attached the tabs 11 have already been secured to opposite end portions of the inner sections 2 and that the insulation 8 has been placed around the section 2 and held thereagainst by any suitable means, such as a metal band (not shown), simply by placing the tabs 14 on the tabs 11 attached to one of the disks 6 on the inner section 2 and inserting the unit, comprising the inner section 2 and the disks 6 to which are secured the tabs 11 (the tabs 11 on one of the disks 6 have the tabs 14 placed thereon as previously stated), within the section 3 until the tabs 14 are alined with the screw receiving holes in the recess 12 whereupon the screws 13 are inserted and tightened to hold one end of the unit within the section 3. In this connection, the unit comprising the inner section 2 and disks 6 may be first inserted within the outer section 3 until the left-hand end of the unit is nearly flush with the flanged end 4 of the outer section 3 whereupon the tabs 14 may be positioned on the tabs 11 and the unit including the tabs 14 on the left-hand end thereof inserted further until the tabs 14 are disposed within the recess 12 in the flanged end 4 whereupon the screws 13 are inserted to complete this end of the assembly. The next step is to apply the tool 18 to the left-hand end of the assembly shown in Fig. 5 and to turn the threaded push bar actuating rod 19, thereby flexing the disk 6 and moving the inner section 2 to the right until the disk 6 on the right-hand end thereof is sufficiently beyond the adjacent end of the outer section 3 to permit placing the tabs 14 on the tabs 11 as previously described. When this has been completed, the actuating rod 19 is turned in the opposite or releasing direction until the tabs 14 are disposed in the recess 12 whereupon the screws 13 are inserted completing the assembly. The tool 18 is then removed which results in both disks 6 being flexed axially toward each other in the manner shown in Fig. 1. If piping of greater length than is provided by a single section is desired, additional sections may be assembled in the manner just described and the sections secured together in the coaxial abutting relation shown in Fig. 1 by bolting together their abutting flanged ends 4. It is entirely immaterial whether the unit comprising the inner section 2 and the disks 6 is inserted within the outer section 3 from either the left-hand or the right-hand end thereof. In fact, assembly is greatly facilitated with respect to the application of the tabs 14 if the unit is placed in a vertical position. The manner of assembly just described is merely illustrative and may be varied as desired to meet particular requirements.

Turbine inlet piping embodying the invention minimizes heat transfer to the outer surrounding wall and reduces the stresses, which would normally be set up in the inner section and its supporting means by the relative expansion of interconnected parts as the structure attains its operating temperature, substantially to zero values. In other words, as the stress resistant properties of the lining and its supporting means become less and less due to increases in temperature, the forces tending to stress said lining and its supporting means are reduced to substantially zero values.

The invention is applicable to high temperature gaseous fluid confining structures for all purposes and although the invention is illustrated and described as applied to turbine inlet piping employed in combustion gas turbine systems, it should be understood that it is not desired to limit the invention to the exact details of construction herein shown and descrived, as various modifications within the scope of the appended claims may occur to persons skilled in the art.

It is claimed and desired to secure by Letters Patent:

1. A confining structure for a high-temperature gaseous fluid comprising an outer wall, an inner wall of less length than said outer wall, and members longitudinally flexible relative to each other interconnecting end portions of said inner wall with opposed portions of said outer wall which are longitudinally spaced apart a distance greater than the length of said inner wall by an amount approximately equal to the maximum distance the inner wall expands longitudinally when in contact with said fluid.

2. A confining structure for a high-temperature gaseous fluid comprising an outer wall, an inner wall of less length than said outer wall, members longitudinally flexible relative to each other interconnecting end portions of said inner wall with opposed portions of said outer wall which are longitudinally spaced apart a distance greater than the length of said inner wall by an amount approximately equal to the maximum distance the inner wall expands longitudinally when in contact with said fluid, said members forming with said inner and outer walls an insulating space having said members as side walls, and insulation substantially filling said space.

3. A confining structure for a high temperature gaseous fluid comprising an outer wall, an inner wall of less length than said outer wall, members longitudinally flexible relative to each other interconnecting end portions of said inner wall with opposed portions of said outer wall which are longitudinally spaced apart a distance greater than the length of said inner wall by an amount approximately equal to the maximum distance the inner wall expands longitudinally when in contact with said fluid, said members forming with said inner and outer walls an insulating space having breathing openings in a wall thereof, and permeable insulation substantially filling said space.

4. A confining structure for a high-temperature gaseous fluid comprising an annular outer wall, an annular inner wall of less length than said outer wall, and annular spacing disks longitudinally flexible relative to each other interconnecting end portions of said inner wall with opposed portions of said outer wall which are longitudinally spaced apart a distance greater than the length of said inner wall by an amount approximately equal to the maximum distance the inner wall expands longitudinally when in contact with said fluid.

5. A confining structure for a high-temperature gaseous fluid comprising an annular outer wall, an annular inner wall of less length than said outer wall, and an annular spacing disk flexed longitudinally to connect each end portion of said inner wall with an opposed portion of said outer wall which is spaced longitudinally beyond the adjacent connection to said inner wall a distance approximately equal to half the maximum distance the inner wall expands longitudinally when in contact with said fluid.

6. A confining structure for a high temperature gaseous fluid comprising an annular outer wall, a coaxial inner wall of less length than said outer wall, an annular spacing disk flexed longitudinally to connect each end portion of said inner wall with an opposed portion of said outer wall which is spaced longitudinally beyond the adjacent connection to said inner wall a distance approximately equal to half the maximum distance the inner wall expands longitudinally when in contact with said fluid, said disks and inner wall forming with the opposed inner surface of said outer wall an annular insulating space having breathing openings in a wall thereof, and permeable insulation substantially filling said space.

7. A confining structure for a high-temperature a gaseous fluid comprising an annular outer wall, a coaxial inner wall formed by longitudinal sections and a pair of spacing and supporting disks longitudinally flexible relative to each other for each section, said disks of each pair having their inner edges partially spaced from and connected only at circumferentially spaced points with the end portions of one of said sections and having their outer edges partially spaced from and connected only at circumferentially spaced points with the opposed portions of said outer wall for radial movement relative thereto, said points of connection to said outer wall being longitudinally spaced apart a distance greater than the length of said section by an amount approximately equal to the maximum distance the section expands longitudinally when in contact with said fluid, and permeable insulation substantially filling each compartment formed by one of said sections, the opposed inner surface of said outer wall and a pair of said disks.

8. A confining structure for a high-temperature gaseous fluid comprising an outer wall, longitudinally spaced inner wall sections, and walls flexible relative to each other interconnecting said sections and outer wall and forming therewith juxtapositioned compartments having the opposed side walls on adjacent compartments flexed apart at their inner edges distances approximately equal to the maximum distance an inner wall sections expands when in contact with said fluid.

9. A confining structure for a high-temperature gaseous fluid comprising an outer wall, longitudinally spaced inner wall sections, walls flexible relative to each other interconnecting said sections and outer wall for relative radial movement and forming therewith juxtapositioned compartments having the opposed side walls on adjacent compartments flexed apart at their inner edges distances approximately equal to the maximum distance an inner wall section expands when in contact with said fluid, and insulation substantially filling said compartments.

10. A confining structure for a high-temperature gaseous fluid comprising an annular outer wall, longitudinally spaced annular inner wall sections, and disks flexible relative to each other interconnecting said sections and outer wall and forming therewith juxtapositioned coaxial compartments having the opposed side walls on adjacent compartments flexed apart at their inner edges distances approximately equal to the maximum distance an inner wall section expands longitudinally when in contact with said fluid.

11. A confining structure for a high-temperature gaseous fluid comprising an annular outer wall, longitudinally spaced annular inner wall sections, and disks flexible relative to each other interconnecting said sections and outer wall and forming therewith juxtapositioned coaxial compartments having breathing openings in a side wall thereof and having the opposed side walls on adjacent compartments flexed apart at their inner edges distances approximately equal to the maximum distance an inner wall section expands longitudinally when in contact with said fluid, and permeable insulation substantially filling said compartments.

HANS A. ALTORFER.